(12) United States Patent
Sunda et al.

(10) Patent No.: US 7,545,367 B2
(45) Date of Patent: Jun. 9, 2009

(54) ROTARY INPUT APPARATUS

(75) Inventors: Takashi Sunda, Kanagawa (JP); Takeshi Mitamura, West Bloomfield, MI (US)

(73) Assignee: Nissan Motor Co., Ltd., Kanagawa (JP)

( * ) Notice: Subject to any disclaimer, the term of this patent is extended or adjusted under 35 U.S.C. 154(b) by 1016 days.

(21) Appl. No.: 10/308,100

(22) Filed: Dec. 3, 2002

(65) Prior Publication Data

US 2003/0103044 A1   Jun. 5, 2003

(30) Foreign Application Priority Data

Dec. 3, 2001   (JP)   ............... 2001-368138

(51) Int. Cl.
*G06F 3/033* (2006.01)
*G09G 5/00* (2006.01)
*G06F 3/01* (2006.01)

(52) U.S. Cl. ............... 345/184; 345/156; 715/701

(58) Field of Classification Search ............... 345/184
See application file for complete search history.

(56) References Cited

U.S. PATENT DOCUMENTS

| | | | | |
|---|---|---|---|---|
| 5,903,229 | A | 5/1999 | Kishi | 341/20 |
| 6,128,006 | A * | 10/2000 | Rosenberg et al. | 345/163 |
| 6,154,201 | A * | 11/2000 | Levin et al. | 345/184 |
| 6,593,667 | B1 * | 7/2003 | Onodera et al. | 307/10.1 |
| 6,636,197 | B1 * | 10/2003 | Goldenberg et al. | 345/156 |
| 6,686,911 | B1 * | 2/2004 | Levin et al. | 345/184 |
| 6,756,967 | B2 * | 6/2004 | Onodera et al. | 345/161 |
| 6,838,851 | B2 * | 1/2005 | Hayasaka | 318/561 |
| 6,956,558 | B1 * | 10/2005 | Rosenberg et al. | 345/156 |
| 2004/0046751 | A1 * | 3/2004 | Heimermann et al. | 345/184 |

FOREIGN PATENT DOCUMENTS

| | | |
|---|---|---|
| JP | 1290021 | 11/1989 |
| JP | 9101858 | 4/1997 |
| JP | 10-083253 | 3/1998 |
| JP | 11-305938 | 11/1999 |
| JP | 2000-100272 | 4/2000 |
| JP | 2001-265527 A | 9/2001 |

OTHER PUBLICATIONS

Japanese Office Action issued in corresponding Japanese Patent Application No. 2001-368138, dated Mar. 27, 2006.

* cited by examiner

*Primary Examiner*—M Good Johnson
(74) *Attorney, Agent, or Firm*—McDermott Will & Emery LLP

(57) ABSTRACT

In a rotary input apparatus, an operational end enabled to be rotationally operated is provided, an operational input device detects a rotational displacement of the operational end to move a pointer displayed on a display thereof to perform a selection operation of any one of various kinds of selection items displayed on the display and a driving force generating section generates and transmits a driving force to the operational end in accordance with a reaction force pattern when the operational end is rotationally operated, the operational input device setting the reaction force pattern against the rotational displacement of the operational end and varying the reaction force pattern on the basis of an input signal from at least one of an internal of and an external to the operational input device when the operational end is rotationally operated.

16 Claims, 8 Drawing Sheets

ROTARY INPUT APPARATUS

BACKGROUND OF THE INVENTION

1. Field of the Invention

The present invention relates to a rotary input apparatus, for example, mounted on an automotive vehicle and which carries out various operational inputs and, particularly, relates to a technique of preventing an erroneous operation for the rotary input apparatus.

2. Description of the Related Art

A previously proposed on-vehicle operational switch in which an erroneous operation preventing countermeasure is carried out is exemplified by a Japanese Patent Application First Publication No. 2000-100272 published on Apr. 7, 2000. In the previously proposed on-vehicle operational switch, such a state of a large acceleration that a posture of an vehicular occupant tends to become unstable is determined according to various sensor information and, even if the switch operation is carried out during the large acceleration state described above, a switch signal indicating the switch operation is not outputted to a corresponding on-vehicle equipment. In details, if a switch input occurs and this switch operation is carried out under the large acceleration, this switch operation is neglected so as to prevent the erroneous operation under the large acceleration. If this switch input is carried out under no large acceleration, this switch operation is accepted.

SUMMARY OF THE INVENTION

In the erroneous operation preventing countermeasure of the previously proposed on-vehicle operational switch, the switch input can be neglected under such a situation under which the erroneous operation is easy to occur. Since, in this countermeasure, the switch operation itself is possible, the corresponding on-vehicle equipment does not accordingly operate in spite of the fact that the switch has been operated. Therefore, an operator often erroneously recognizes that this non-operation of the equipment is caused by a failure of the equipment itself. Consequently, such an action as a long time notice or gazing on a display or re-operation of the switch is taken and there is a possibility of giving a further operational burden on the operator.

It is, hence, an object of the present invention to provide a rotary input apparatus and a method applicable to the rotary input apparatus which can prevent the operator from erroneously operating the switch and can be compatible between an erroneous operation prevention function and a favorable operability assurance without impeding the operability assurance without impeding the operability under the situation under which the erroneous operation is not easy to occur by assuring the switch operation itself under the situation under which the erroneous operation is easy to occur when the switch is operated.

According to one aspect of the present invention, there is provided a rotary input apparatus comprising: an operational end which is enabled to be rotationally operated; an operational input device that detects a rotational displacement of the operational end to move a pointer displayed on a display section to perform a selection operation of any one of various kinds of selection items displayed on the display section; and a driving force generating section that generates and transmits a driving force to the operational end in accordance with a reaction force pattern when the operational end is rotationally operated, the operational input device setting the reaction force pattern against the rotational displacement of the operational end and varying the reaction force pattern on the basis of an input signal from at least one of an internal of and an external to the operational input device when the operational end is rotationally operated.

According to another aspect of the present invention, there is provided a method applicable to a rotary input apparatus, the rotary input apparatus comprising: an operational end which is enabled to be rotationally operated; and an operational input device that detects a rotational displacement of the operational end to move a pointer displayed on a display thereof to perform a selection operation of any one of various kinds of selection items displayed on the display, the method comprising: providing a driving force generating section that generates and transmits a driving force to the operational end in accordance with a reaction force pattern when the operational end is rotationally operated; setting the reaction force pattern against the rotational displacement of the operational end; and varying the reaction force pattern on the basis of an input signal from at least one of an internal of and an external to the operational input device when the operational end is rotationally operated.

This summary of the invention does not necessarily describe all necessary features so that the invention may also be a sub-combination of these described features.

DETAILED DESCRIPTION OF THE PREFERRED EMBODIMENTS

Reference will hereinafter be made to the drawings in order to facilitate a better understanding of the present invention.

FIGS. 1 through 9 show drawings representing a first preferred embodiment of a rotary input apparatus according to the present invention.

Figure 1:
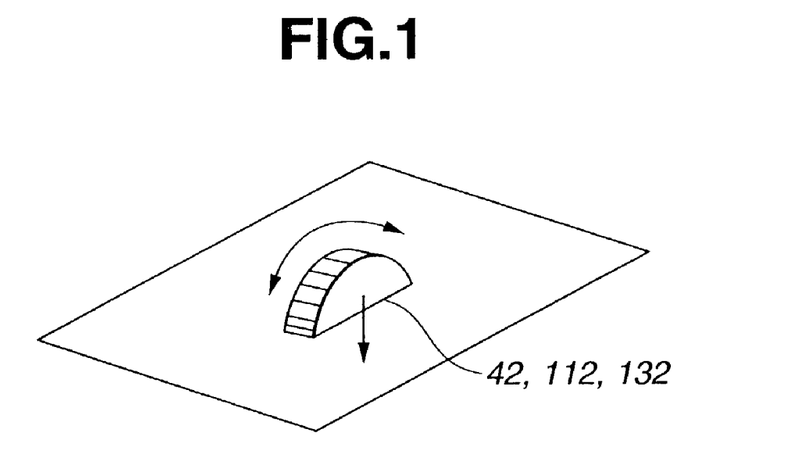
FIG. 1 is an explanatory view of an outer appearance and operation directions of a wheel of a rotary input apparatus in each of the first, second, and third preferred embodiments according to the present invention.

In the first embodiment, with an operational intensity of a wheel which constitutes an operational end (a kind of rotary switch and also called a jog dial) by an operator and a vibration developed on a surrounding of the operational end taken into consideration, a situation under which an erroneous operation is easy to occur is detected on the basis of a signal of a rotational quantity (or rotational displacement) detection sensor on the operational end. By controlling a reaction force pattern (a resistance force against an operational force developed on the operational end) which is made correspondent to each selection item on a menu selection image screen displayed on a display (display section), the rotary input apparatus in this embodiment prevents an operation mistake (the erroneous operation) by the operator. That is to say, the rotary input apparatus includes wheel 42 whose outer appearance is shown in FIG. 1. For wheel 42, a reversible rotational operation in a rotation direction thereof is enabled and a push operation is also enabled.

Figure 2:
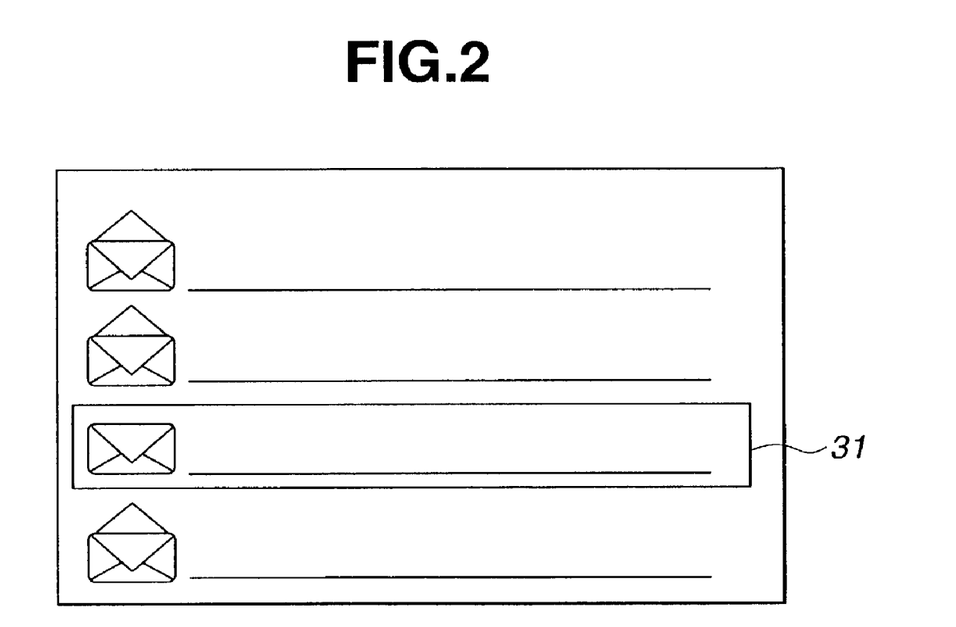
FIG. 2 is an explanatory view representing a display example of a selection item menu listing which is an object to be operated for the wheel shown in FIG. 1.

A pointer 31 displayed over the selection item menu is an object to be operated, as shown in FIG. 2, and is displayed on the display (display section 49). The rotational operation of wheel 42 by the operator causes pointer 31 to be moved. Then, a sequential selection of the menu is carried out. By pushing wheel 42 with pointer 31 present on the desired menu, a desired menu item can be selected.

Figure 3:
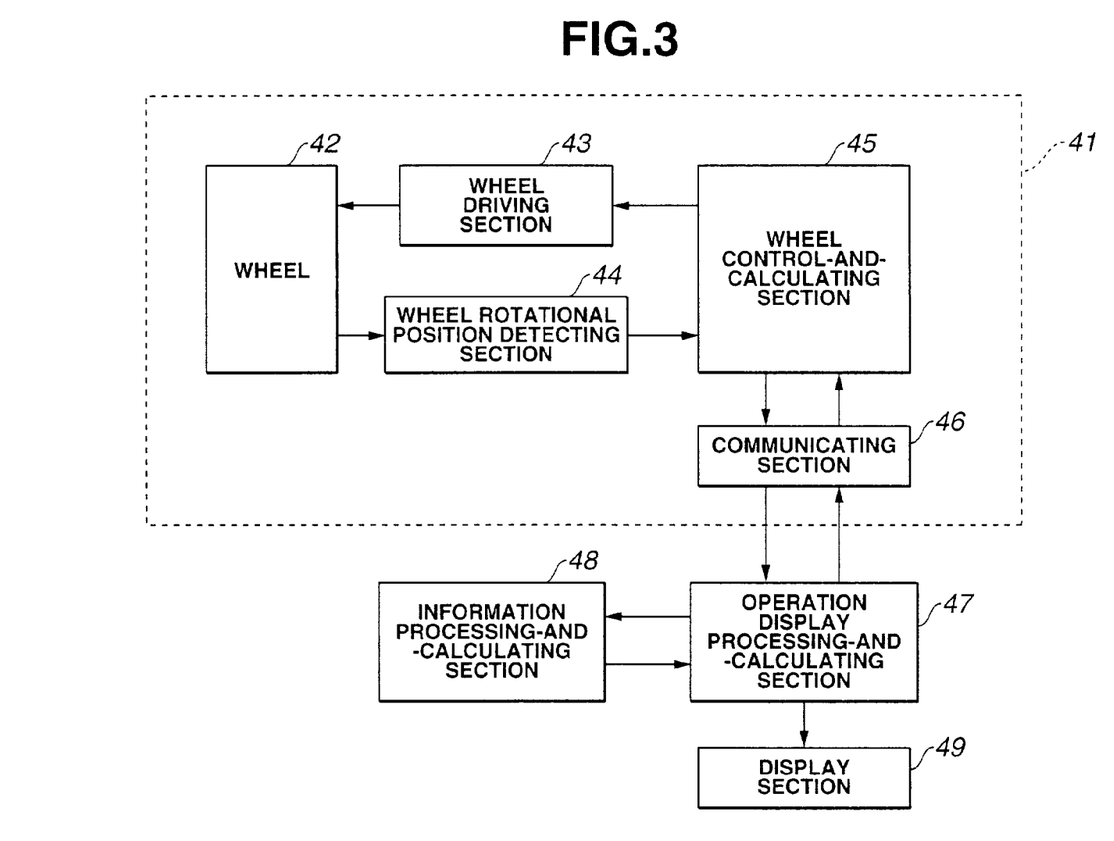
FIG. 3 is a block diagram representing a structure of the whole rotary input apparatus in the first embodiment according to the present invention.

Next, a structure of the rotary input apparatus in the first embodiment according to the present invention will be described with reference to the block diagram of FIG. 3. The rotary input apparatus includes an operational input device 41.

Operational input device 41 includes: wheel 42 which provides the operational end described above; a wheel driving section 43 (driving force generating means) that drivingly develops a torque in a rotational direction of wheel 42; a wheel position detecting section 44 that detects a rotational angle (rotational displacement) and push operation of wheel 42; a wheel control-and-calculating section 45; and a communicating section 46.

Wheel control-and-calculating section 45 digitalizes a position detection signal outputted from the wheel rotational position detecting section 44 to be converted into the wheel position information. Furthermore, the positional information receives the differentiation of a first order and of a second order to calculate a rotational positional angular velocity and a rotational angular acceleration of wheel 42. Wheel control-and-calculating section 45 detects the vibration of wheel 42 according to a history of the wheel position. In addition, on the basis of a basic reaction force pattern information received from an operation, display processing-and-calculating section 47 as will be described later, the present and subsequent selection item corresponding to the reaction force pattern is correctively calculated from each data of the wheel rotation angular velocity and the vibration developed (on the surrounding of) in the vicinity to wheel 42. Then, the presently developed torque quantity is calculated on the basis of the reaction force pattern after the correction and the wheel position. Then, a torque control signal is outputted to wheel driving section 43.

Communicating section 46 outputs the wheel position information supplied from wheel control-and-calculating section 45 to external operation display-and-calculating section 47. The basic reaction pattern information supplied from this operation display processing-and-calculating section 47 is outputted to the wheel control-and-calculating section 45.

As a specific example, wheel driving section 43 can be constituted by an electric motor and wheel rotational position detecting section 44 can be constituted by a rotary encoder or a tact switch. Wheel control calculating section 45 includes a controller having an A/D (Analog-to-Digital) converter, CPU (Central Processing Unit), ROM (Read Only Memory), a RAM (Random Access Memory), and so on. Communicating section 46 includes a serial interface circuit. It is of course that wheel control calculating section 45 may be constituted by another device having the same function.

Operation display processing-and-calculating section 47 connected to operational input device 41 includes a communicating portion therein which has compatibility to communicating section 46 and determines the position of pointer 31 to select a selection menu item displayed on display section 49. Furthermore, in a case where the wheel push operation is recognized from this wheel positional information, one of the menu items which is selected and determined is outputted to information processing-and-calculating section 48.

Information processing-and-calculating section 48 implements this information processing corresponding to the menu item selected and determined and outputs a listing of the subsequent selection menu according to its necessity to operation display processing-and-calculating section 47.

Operation display processing-and-calculating section 47 updates the basic reaction force pattern to be outputted to operational input device 41 to a corrected new reaction pattern in a case where a new selection menu listing is inputted. Furthermore, operation display processing-and-calculating section 47 generates a display video image on the basis of the present selection menu listing and the position of pointer 31 and outputs the selection menu video image to display section 49. Although, in the first embodiment, operation display processing-and-calculating section 47 and information processing-and-calculating section 48 have mutually different functions, these functions may be achieved by a single device.

It is not always necessary for a function sharing between wheel control-and-calculating section 45 and operation display processing-and-calculating section 47 to be in accordance with those described in the first embodiment. For example, the correction of the reaction force pattern corresponding to the present and subsequent selection menus to be executed by wheel control-and-calculating section 45 may be executed by operation display processing-and-calculating section 47 and may be outputted to wheel control-and-operation calculating section 45. Then, wheel control-and-calculating section 45 may calculate the present torque quantity from the reaction force pattern after the correction and wheel position.

Furthermore, operation display processing-and-calculating section 47 may calculate the present torque quantity. In this case, it is necessary to output the torque quantity on a real time basis from operation displaying processing-and-calculating section 47 to operational input device 41. Hence, a communication speed between operation display processing-and-calculating section 47 and communicating section 46 may be required to be at a high speed.

Figure 4:
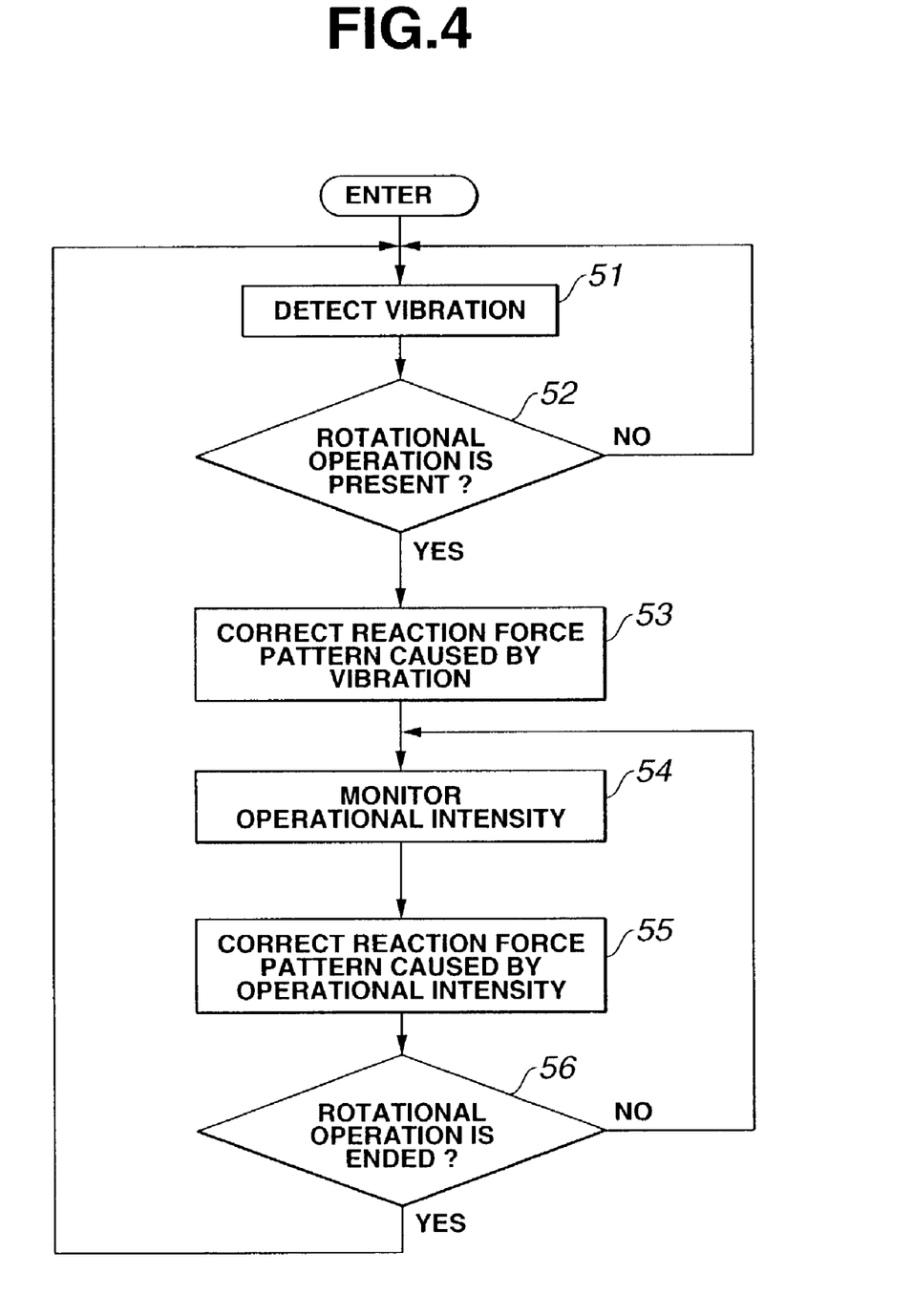
FIG. 4 is an operational flowchart representing a control procedure of the wheel shown in FIG. 1 and a wheel driving section executed by a wheel control-and-calculating section shown in FIG. 3 in the case of the first embodiment.

A processing procedure of the development of the reaction force pattern in case of the first embodiment of the rotary input apparatus will be described. The selection menu as shown in FIG. 2 is supposed to be the object to be operated. FIG. 4 shows an operational flowchart representing the processing procedure executed by wheel control-and-processing section 45 in the first embodiment described above.

Figure 5:
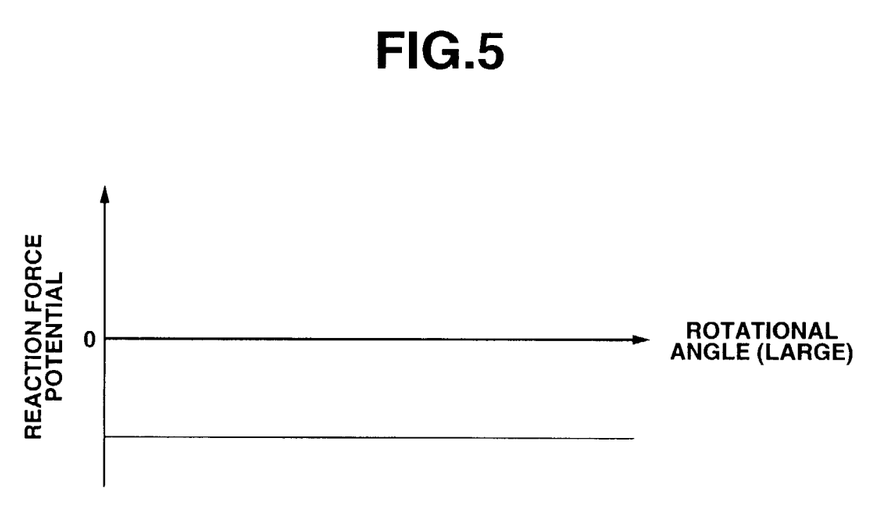
FIG. 5 is a characteristic graph representing a reaction force pattern when no operation on the wheel shown in FIG. 1 is carried out but a vibration is detected in the case of the first embodiment of the rotary input apparatus according to the present invention.

In FIG. 4, at a step S51, a vibration detection is carried out. That is to say, the vibration developed on the surrounding of wheel 42 is detected. It is noted that, in a state of step S51, a wheel operation by the operator is supposed not to be carried out and wheel control-and-calculating section 45 controls wheel driving section 43 with a reaction force pattern having a constant value with respect to a variation in a rotational angle of wheel 42. It is also noted that a reaction force potential as a longitudinal axis in FIG. 5 is an index of a value to which the reaction force developed so as to correspond to the rotational angle of wheel 42 is integrated and is used for the later explanation since the reaction force pattern is visually easy to be imaged. It is noted that the reaction force actually developed is a gradient of each reaction force potential representing graph (which will be described later) with respect to an instantaneous rotational angle.

The reaction force pattern shown in FIG. 5 provides the constant value as described above and wheel 42 is in a free state without an application of the reaction force. In the free state, a wheel position is vibrated due to the vibration developed in the vicinity to wheel 42. A frequency and an amplitude of the vibration developed in the vicinity to wheel 42 can be detected by monitoring a (time) history of the wheel position inputted from wheel (rotational) position detecting section 44. Next, at a step 52 shown in FIG. 4, wheel control-and-calculating section 45 determines whether the operator has carried out the rotational operation of wheel 42. If wheel control-and-calculating section 45 detects that the wheel position has continuously moved in a constant direction from the history of the wheel position inputted from wheel position detecting section 44, wheel control-and-calculating section 45 determines that the operator has carried out the rotational operation and stores the results of detection of vibration (frequency and amplitude of wheel vibration) at step 51 which is immediately before step 52 into a memory (not shown but, for example, the RAM in wheel control-and-calculating section 45) and the routine goes to a step 53.

Figure 6:
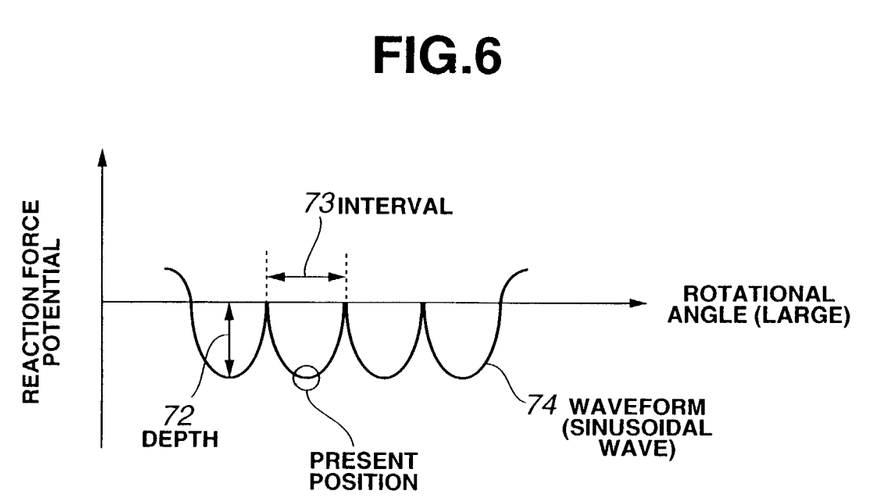
FIG. 6 is a characteristic graph representing a basic reaction force pattern having a plurality of detents corresponding to the selection items in a case of each of the first, second, and third embodiments of the rotary input apparatus according to the present invention.

Otherwise, wheel control and calculating section 45 determines that the operator has not carried out the operation and the routine returns to step 51 to continue to detect the vibration at step 51. Thereafter, if the rotational operation is present at step 52, the routine goes to a step 53 in which a basic reaction force pattern corresponding to the selection menu list, as shown in FIG. 6, is corrected on the basis of the results of detection in vibration stored at step 52. That is to say, the reaction potential characteristic having the constant value as shown in FIG. 5 is varied to a characteristic shown in FIG. 6. Consequently, the basic reaction force pattern information inputted from operation display processing-and-calculating section 47 via communicating section 46 indicates such a characteristic curve constituted by four detents (a concavity formed detent pattern having pawls at both sides of each detent) in the case of four selection items as shown in FIG. 3. Each selection item and each detent are made correspond to one another having a one-to-one relationship. Parameters characterizing the individual detents are a depth 72 of the reaction force potential, an interval 73 thereof, and a waveform 74 thereof shown in FIG. 6. As the basic reaction force pattern shown in FIG. 6, parameter values which are necessary and sufficient to enable perception of the reaction force pattern by the operator at a predetermined operational intensity are set, with no vibration developed on wheel 42.

Figure 7:
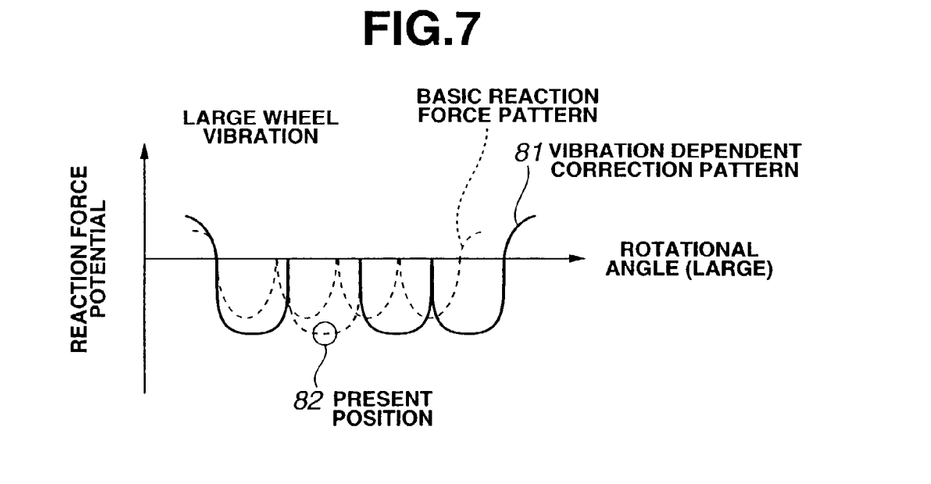
FIG. 7 is a characteristic graph representing a state of the basic reaction force pattern which is changed to a vibration dependent correction pattern in a case of the first, second, and third preferred embodiments according to the present invention.

It is necessary to identify the setting of the parameter values through a statistical method since perception ability of the reaction force pattern has differences among individuals. If the operational end (wheel 42) is used exclusively for the individual, it is possible to tune the parameter values to meet with the individual. The correction of the parameters of the basic reaction force pattern thus set in accordance with the results of detection of the vibration stored in the memory at step 52 is, at a temporary time, added. Basically, as shown in FIG. 7, as a disturbance to the sense of touch due to the wheel vibration becomes larger, the depth and interval of the detent parameters are accordingly increased. Furthermore, since the waveform thereof is transformed from a sinusoidal waveform (a sinusoidal wave in a half waveform) to a rectangular waveform, the reaction force pattern can clearly be perceived even during the occurrence in the vibration. It is necessary to determine actual correction quantities for the parameters through physical consideration or experiments so that the reaction force pattern can be perceived for each condition with a combination of the frequency and the amplitude of the wheel vibration as a condition. Furthermore, in a case where the differences among the perception ability is considered, it is necessary to use the statistical method together with the physical considerations or the experiments.

In addition, the correction of the parameters used when the reaction force pattern is set may continuously be corrected for the condition of the vibration on wheel 42 or may be corrected in a stepwise manner provided that the same advantages can be expected. As described above, after the detent parameters are corrected according to the vibrations of wheel 42, the wheel driving section 43 is controlled on the basis of reaction force pattern 81 after the correction (vibration dependent correction pattern shown in FIG. 7).

At this time, when wheel 42 starts development of the reaction force from the free state, a positioning of reaction force pattern 81 is carried out so that a bottom portion (a flat portion) of the present detent of the reaction force pattern to which reaction force pattern 81 corresponds is made coincident with present position 82 in order for the operator not to feel that the wheel rotation is in a transient state and, thereafter, the development of the reaction force is started.

Next, at a step 54 shown in FIG. 4, an operational intensity during the wheel rotational operation by the operator is monitored. The wheel rotational angular velocity and rotational angular acceleration are determined at an instant at which wheel 42 gets over one of the pawls of the present detent pattern (a local extreme value portion between two mutually adjacent detent patterns) from the wheel positional information inputted from wheel position detecting section 44, wheel rotational angular velocity obtained by first-order differentiating the wheel position information, and wheel rotational angular acceleration obtained by second-order differentiating the wheel position information and are stored in the memory.

It is necessary to set a sampling frequency of wheel position detecting section 44 to a sufficiently higher value in order to detect the instant time at which wheel 42 gets over the pawl of the corresponding detent. If the sufficiently high sampling frequency is not obtained due to a performance limit of wheel position detecting section 44, an extrapolation of the sampled values before several cycles of the instant time described above is carried out so that wheel rotational angular velocity and wheel rotational angular acceleration at the instant when wheel 42 gets over the pawl of the corresponding detent can be predicted.

Figure 8:
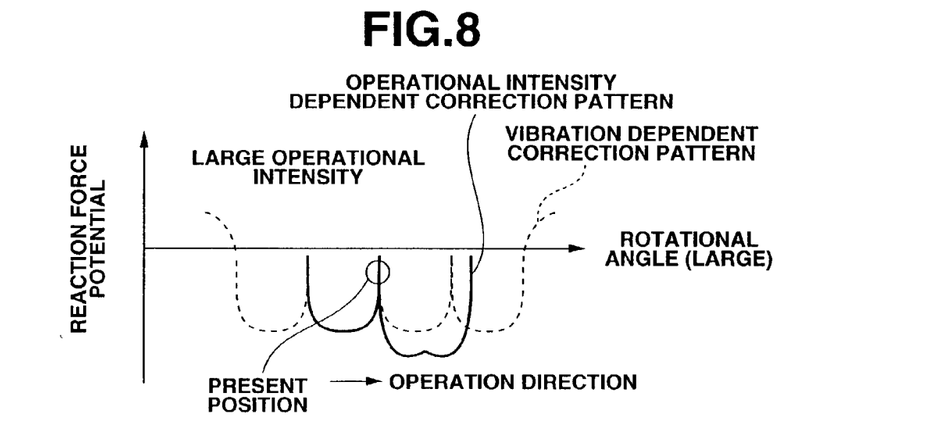
FIG. 8 is a characteristic graph representing a parameter correction procedure of a subsequent detent of the detents constituting the vibration dependent correction pattern in a case where an operational intensity for the wheel is equal to or larger than a predetermined operational intensity in the case of each of the first, second, and third preferred embodiments according to the present invention.
Figure 9:
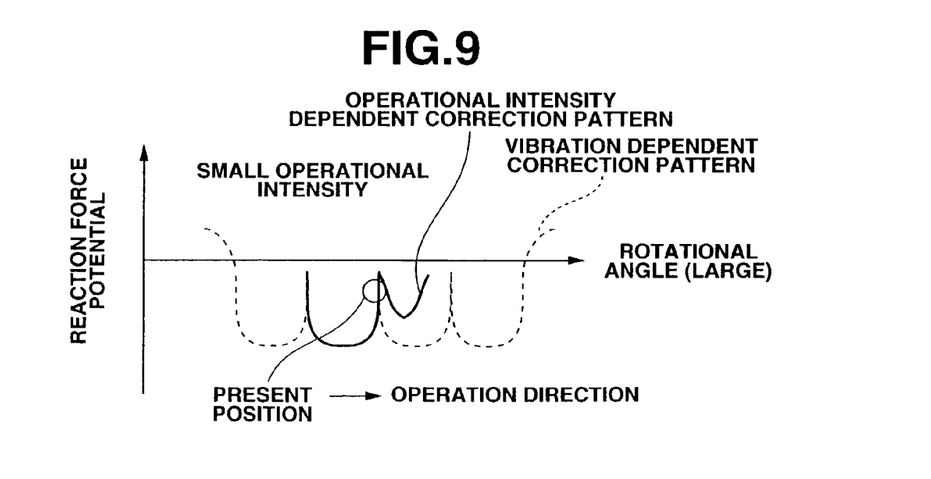
FIG. 9 is a characteristic graph representing a parameter correction procedure of the subsequent detent of the detents constituting the vibration dependent correction pattern in a case where an operational intensity for the wheel is equal to or FIG. 10 is a block diagram representing a structure of the whole rotary input apparatus in the second embodiment according to the present invention.

Next, at a step 55, the reaction force pattern corrected at step S53 is further corrected in accordance with the operational intensity (wheel rotational angular velocity and rotational angular acceleration) at the instant when wheel 42 gets over the pawl of the corresponding detent pattern stored at step 54. Basically, as the operational intensity at the instant when wheel 42 gets over the pawl of the detent pattern is larger than a predetermined operational intensity, the depth and interval of the subsequent detent pattern (right side of FIG. 8) are increased, as shown in FIG. 8, and, furthermore, the waveform is transformed from the sinusoidal wave to the rectangular wave. Hence, even under such a situation that, under a constant reaction force pattern, the operational intensity is so large that wheel 42 tends to jump over the subsequent detent, the reaction force pattern can accurately be perceived On the contrary, as the operational intensity at the instant time at which wheel 42 gets over the pawl of the present detent becomes smaller than the predetermined operational intensity, the depth and the interval of the subsequent pattern (a bold solid line at a right side of FIG. 9), as shown in FIG. 9, are decreased and, furthermore, the waveform thereof is transformed from the sinusoidal wave to a triangular wave. Thus, even under such a situation that, under the constant reaction force pattern, the present detent pattern is large for the operational intensity and the operator tends to feel a great burden imposed on him, appropriate operational reaction force and stroke permits an efficient operation.

The actual parameter correction quantities are as follows: It is necessary to determine the necessary and sufficient correction quantities such that the subsequent reaction force pattern can be perceived under each condition, with the operational intensity at the instant at which wheel 42 gets over the pawl of the present detent pattern through the physical consideration or experiments. Furthermore, it is necessary to use the statistical method together with the physical considerations or the experiments in a case where the differences among the individuals in the perception ability are considered. The correction of the parameters may be made in the continuous manner for the condition of the operational intensity or may be made in the stepwise manner provided that the same advantages can be expected.

Furthermore, in the first embodiment, both values of the wheel rotational angular velocity and rotational angular acceleration are used as the operational intensity. However, only one of these rotational angular velocity and rotational angular acceleration may be incorporated into the condition of operational intensity. As described above, the parameters of the subsequent detent are corrected according to the operational intensity at the instant time when wheel 42 gets over the pawl of the present detent and, on the basis of the reaction force pattern after the correction of the parameters, wheel driving section 43 is controlled.

In order to correct the parameters of the subsequent detent pattern at the instant when wheel 42 gets over the pawl of the present detent pattern and to switch the detent pattern to another detent pattern so that a transient state is not felt by the operator with the reflection of this switching of the detent pattern on the control of wheel driving section 43, it is necessary to sufficiently increase a calculation cycle of wheel control-and-calculating section 45. However, in a case where a sufficient performance cannot be expected, the parameter correction may be carried out at a time point several cycles before the instant at which wheel 42 gets over the pawl of the present detent. At the next step 56 in FIG. 4, wheel control-and-calculating section 45 determines whether the operator has ended the rotational operation. If a predetermined time has passed from a time point at which the wheel positional movement which is continued in the constant direction has not been detected from the history of the wheel position inputted from wheel (rotational) position detecting section 44, wheel control-and-calculating section 45 determines that the rotational operation has been ended. Then, the routine returns to step 51 in FIG. 4. Otherwise, wheel control and calculating section 45 determines that the operation described above is being continued and the routine returns to step 54 to execute again the monitoring of the operational intensity described above. As described above, since, in the first embodiment, the parameters on the basic reaction force pattern which is constituted by the plurality of detents and which is made correspondent to the selection item are corrected according to the wheel vibration (vibration developed on the surrounding of wheel 42) and operational intensity by the operator. Hence, the operator can accurately recognize the detent pattern corresponding to each of the selection items even under the vibration condition such that the sense of touch is disturbed. Furthermore, even if the operator operates wheel 42 with any intensity, the necessary and sufficient detent pattern can be recognized. Therefore, such a situation that the operator mistakes the selection operation since the operator cannot recognize the detent pattern or the operator gazes steadily the object to be operated such as menu displayed on display section 49 can be prevented. Furthermore, the correction for the parameters described above is carried out so that the detent pattern is not resulted in the detent pattern more than necessary. Hence, the operational efficiency can also be assured.

Since the correction of the parameters to determine the detent pattern is dependent upon the input signal from wheel (rotational) position detecting section 44 which is the essential component of the rotary input apparatus, the rotary input apparatus can be realized with minimum components.

Figure 10:
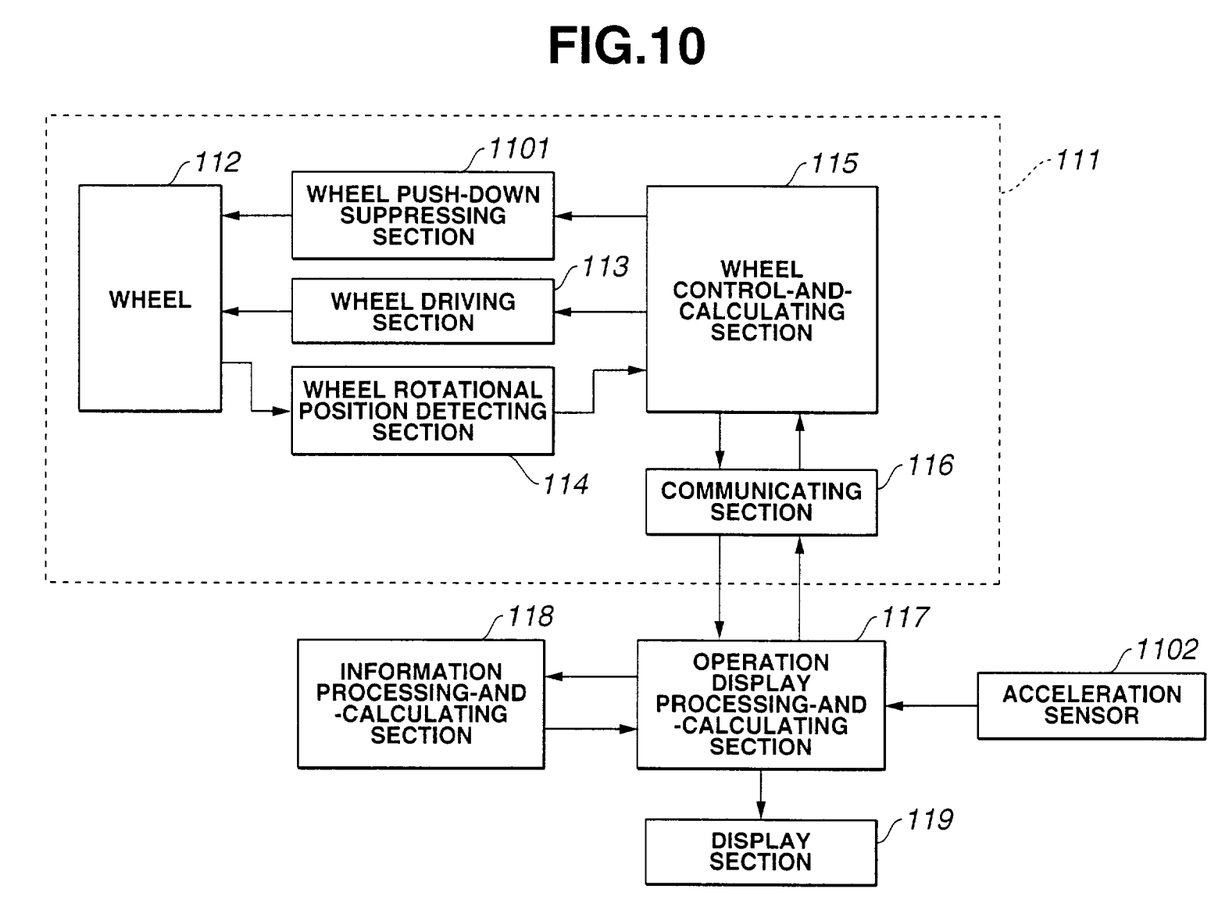
Figure 11:
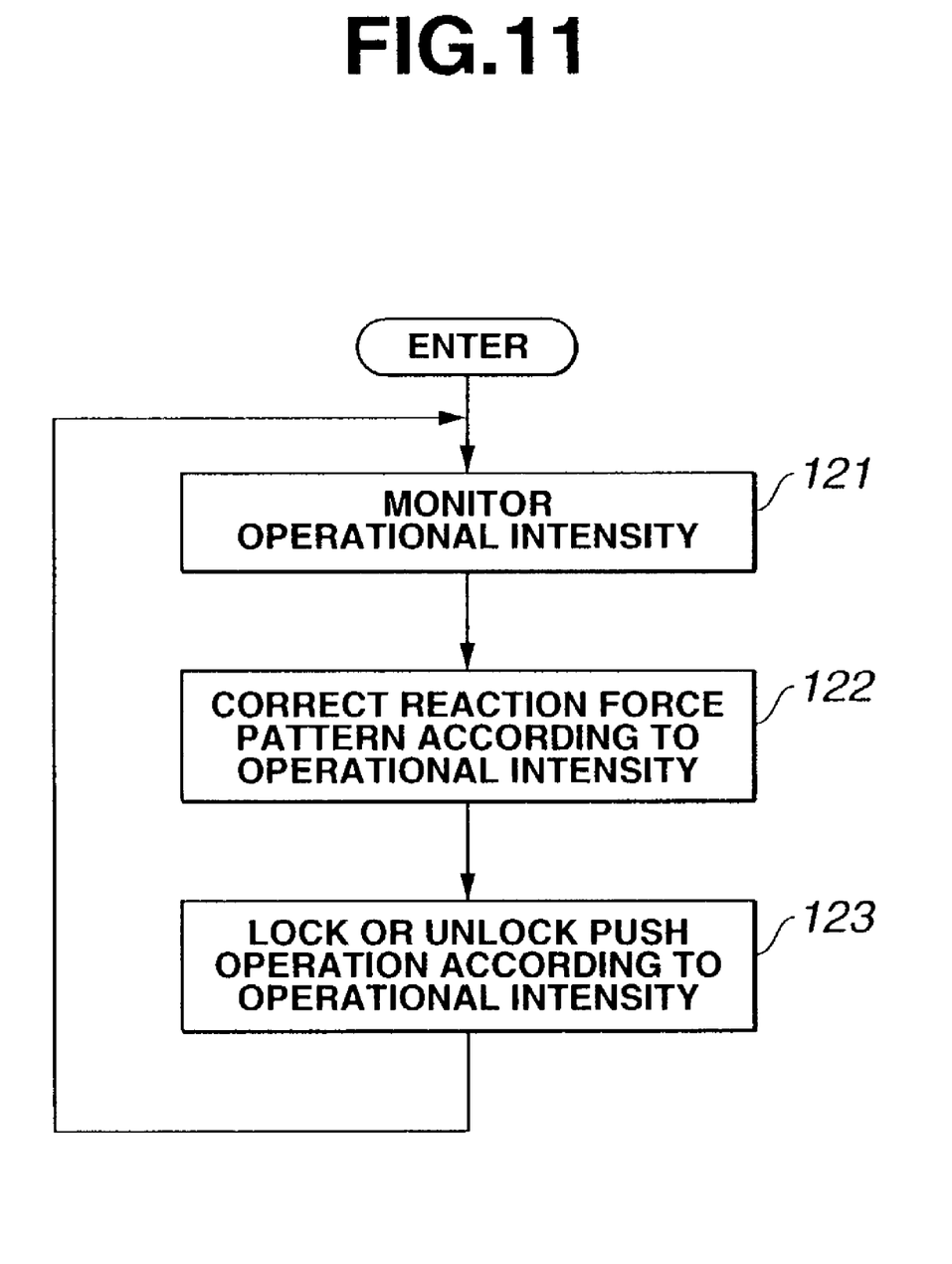
FIG. 11 is an operational flowchart presenting a control procedure of the wheel shown in FIG. 1 executed by the wheel control-and-calculating section in the case of the second embodiment shown in FIG. 10.

Next, a second preferred embodiment of the rotary input apparatus according to the present invention will be described below. FIGS. 10 and 11 show a block diagram and a flowchart of the rotary input apparatus in the second embodiment, respectively. In the second embodiment, the vibration on the operational end detected utilizing the signal of the rotational quantity detecting sensor located on the operational end in the first embodiment is predicted by utilizing an acceleration sensor 1102 which is an external to operational input device 111 in order to achieve the same advantages as described in the first embodiment. Furthermore, in the second embodiment, on the basis of the signal of the rotational quantity detecting sensor located on the operational end, the push operation on wheel 112 while wheel 112 is being rotationally operated is locked and an erroneous operation developed due to an unintentional rotation of the operational end during the push operation thereon is prevented from occurring.

The outer appearance and the operational function of the rotary input apparatus in the second embodiment are generally the same as those described in the first embodiment. The structure of the rotary input apparatus in the second embodiment will be described below with reference to FIG. 10.

Operational input device 111 in the second embodiment shown in FIG. 10 includes: wheel 112 which constitutes the operational end (refer to the wheel shown in FIG. 1); a wheel driving section 113 which develops the torque in the rotational direction of wheel 112; a wheel rotational position detecting section 114 that detects the rotational angle of wheel 112 and an occurrence of the push operation on wheel 112; a wheel push-down suppressing section 1101 which locks and unlocks the push operation on wheel 112; wheel control-and-calculating section 115; and communicating section 116.

Wheel control-and-calculating section 115 digitalizes the position detection signal outputted from wheel rotational position detecting section 114 to convert the position detection signal into a wheel position information. This wheel position information is first-order differentiated to calculate the rotational angular velocity of wheel 112 and is second-order differentiated to calculate the rotational angular acceleration of wheel 112. Then, on the basis of the reaction force pattern information received from operation display processing-and-calculating section 117 connected to operational input device 111, the presently developed torque quantity is calculated from the wheel position and wheel control-and-calculating section 115 outputs a torque control signal to wheel driving section 113. Furthermore, the control signal is outputted to wheel push-down suppressing section 1101 on the basis of the wheel rotational angular velocity and the wheel rotational angular acceleration described above.

Communicating section 116 outputs wheel positional information supplied from wheel control and calculating section 115 to operation display processing-and-calculating section 117 and outputs the reaction force pattern information supplied from operation display processing-and-calculating section 117 to wheel control-and-calculating section 115. Specifically, wheel driving section 113 can be, for example, constituted by the electric motor, wheel position detecting section 114 can be constituted by a rotary encoder and tact switch, wheel push-down suppressing section 1101 can be constituted by a small-sized solenoid interlock, wheel control-and-calculating section 115 can be constituted by the control circuit having the A/D converter, the D/A converter, CPU, ROM, and so on. Communicating section 116 can be constituted by the serial interface circuit. It is natural that each of these sections may be constituted by another device having the same function.

Furthermore, operation display processing-and-calculating section 117 connected to operational input device 111 includes: a communicating section which is in conformity to the communicating section 116 installed within an internal part of section 117. Operation display processing-and-calculating section 117 determines the position of pointer 31 (refer to FIG. 2) on the selection menu displayed on display section 119 on the basis of the wheel positional information inputted from communicating section 116. Furthermore, in a case where the push of wheel positional information, the menu item selected and determined is outputted to the information processing-and-calculating section 118.

Information processing-and-calculating section 118 implements the information processing corresponding to the selected and determined menu item and outputs the list of the subsequent selection menu according to its necessity to operation display processing-and-calculating section 117. Operation display processing-and-calculating section 117 updates the basic reaction force pattern at operational input device 111 in a case where the list of the new selection menu is inputted.

Furthermore, operation display processing-and-calculating section 117 predicts the vibration placed in the vicinity to wheel 112 on the basis of the detection signal of acceleration sensor 1102 installed on a position at which acceleration sensor 1102 is physically contacted on operational input device 111, corrects the basic reaction force pattern according to the predicted vibration, and, thereafter, outputs the corrected reaction force pattern to rotary input apparatus 111.

In addition, operation display processing-and-calculating section 117 generates a display video image on the basis of the present selection menu listing and pointer's position and displays the selected menu video image on display section 119.

Although, in the second embodiment, operation display processing-and-calculating section 117 has the function different from that of information processing-and-calculating 118, these functions of both sections 117 and 118 maybe incorporated into a single device.

It is not always necessary for the function sharing between wheel control-and-calculating section 115 and operation display processing-and-calculating section 117 to be in accordance with this embodiment. The correction calculation of the reaction force pattern due to the vibration to be carried out by operation display processing-and-calculating section 117 may be carried out by wheel control-and-calculating section 115. In addition, the present torque quantity may be calculated by means of operation display processing-and-calculating section 117 to operational input device 111 on the real time basis. Hence, very high-speed communications between operation display processing-and-calculating section 117 and communicating section 116 are required.

Next, a processing of generating the reaction force pattern and a processing of locking the push operation in the case of the second embodiment will be described.

In the second embodiment, such a selection menu listing as shown in FIG. 2 is supposed as the object of be operated in the same way as the first embodiment.

First, the basic reaction force pattern corresponding to the selection menu list shown in FIG. 2 is corrected by means of operation display processing-and-calculating section 117 according to the acceleration inputted from acceleration sensor 1102. The method of correction in this embodiment is generally the same as the method of the correction of the reaction force pattern (step 53 shown in FIG. 4) due to the vibration by means of wheel control-and-calculating section 45 in the first embodiment. However, a difference from the first embodiment is present in that, as the result of detection of the wheel vibration, a result predicted from the input signal from acceleration sensor 1102 is used. It is necessary to derive a calculation equation to predict the wheel vibration from the input signal from acceleration sensor 1102 through the physical considerations or experiments.

The correction calculation of reaction force pattern by operation display processing-and-calculating section 117 is cyclically carried out and the result of correction is outputted to wheel control-and-calculating section 115 via communicating section 116. In addition, in order to perform an accurate correction due to the vibration, it is desirable that a period of calculation is set to be on the real time basis.

Next, the series of processing executed by wheel control-and-calculating section 115 in the second embodiment will be described with reference to the flowchart shown in FIG. 11.

First, at a step 121, wheel control-and-calculating section 115 monitors the operational intensity during the wheel rotating operation by the operator. The content of step 121 shown in FIG. 11 is the same as step 54 described in the first embodiment.

Thereafter, at a step 122, wheel control-and-calculating section 115 corrects the reaction force pattern after the correction measured against the vibration inputted from operation display processing-and-calculating section 117 according to the operational intensity (rotational angular velocity of wheel 112 and the rotational angular acceleration thereof) at the instant at which wheel 112 gets over the pawl of the detent pattern stored at step 121. The correction method is generally the same as that described at step 55 in the first embodiment. However, in order to prevent the operator from being felt to be in the transient state when the detent pattern is switched, all of the corrections carried out at step 122 are not for the present detent pattern but for the subsequent detent pattern including a case in which the reaction force pattern after the correction measured against the vibration inputted from operation display processing-and-calculating section 117. As described above, the parameters of the subsequent detent pattern are corrected according to the operational intensity at the instant at which wheel 112 gets over the pawl of the detent pattern and wheel driving section 113 is controlled on the basis of the reaction force pattern after the correction of the parameters.

Next, the push operation of wheel 112 is locked or unlocked according to the operational intensity. If the wheel rotational angular velocity calculated at step 122 is equal to or larger (faster) than a predetermined threshold value (a predetermined lock angular velocity), wheel control-and-calculating section 115 determines that the push operation on wheel 112 is locked. If the wheel rotational angular velocity calculated at step 122 is equal to or lower than another predetermined threshold value (a predetermined unlock angular velocity), wheel control-and-calculating section 115 determines that the push operation is unlocked. According to the results of the determinations described above, wheel control-and-calculating section 115 controls wheel push-down suppressing section 1101.

It is necessary to set the predetermined lock angular velocity and unlock angular velocity in the vicinity to a minimum rotational velocity at which such an event that an unintentional wheel rotation occurs during the wheel push operation so that an unintended selection item is selected and determined. In an actual practice, it is necessary to identify the lock angular velocity and the unlock angular velocity from specification values such as a diameter of wheel 112, an operational force required during the push operation through physical considerations or through many experiments. It is necessary to set the lock and unlock angular velocities to always satisfy such a relationship as lock angular velocity <unlock angular velocity and to prevent the results of determination on whether the wheel rotational angular velocity is equal to or higher than the predicted threshold value and is equal to or lower than the other predetermined threshold value. In addition, it is necessary to sufficiently increase the processing speed of calculation at step 123 in order to assure the erroneous selection of the menu item and erroneous determination thereof during the push operation on wheel 112. It is noted that in a case where a sufficient calculation speed is not obtained from a performance limit of the device constituting wheel control-and-calculating section 115, the wheel rotational velocity may be predicted through an extrapolation using values of the wheel rotational angular acceleration. In the second embodiment, the parameters of the basic reaction force pattern constituted by the detent pattern which is made correspondent to the selection item are corrected according to the vibration of wheel 112 and according to the operational intensity by the operator. Hence, the operator can accurately recognize the detent pattern corresponding to the selection item even under the vibration condition such that the sense of touch is disturbed.

Furthermore, even if the operator operates wheel 112 with any operational intensity, the necessary and sufficient detent pattern can be recognized. Hence, such a situation that the operator mistakes the selection operation without recognition of the detent pattern or the operator gazes steadily the object to be operated such as the menu displayed on display can be prevented from occurring. Then, since the correction of the parameters is advanced so that the detent pattern is not resulted in the detent pattern more than its necessity, the operational efficiency can be improved.

Furthermore, since the detection of the wheel vibration is sequentially carried out by acceleration sensor 1102 which is external to the operational input device 111 in the second embodiment, there is an advantage that the rotary input apparatus in the second embodiment can speedily respond to a variation in a vibration environment during the wheel operation as compared with the case of the first embodiment. In addition, since the push operation during the rotational operation of wheel 112 is locked, such an erroneous operation that an unintended rotation of the operational end occurs during the wheel push operation so that an unintended selection and determination of the selection item occurs can be prevented from occurring.

Figure 12:
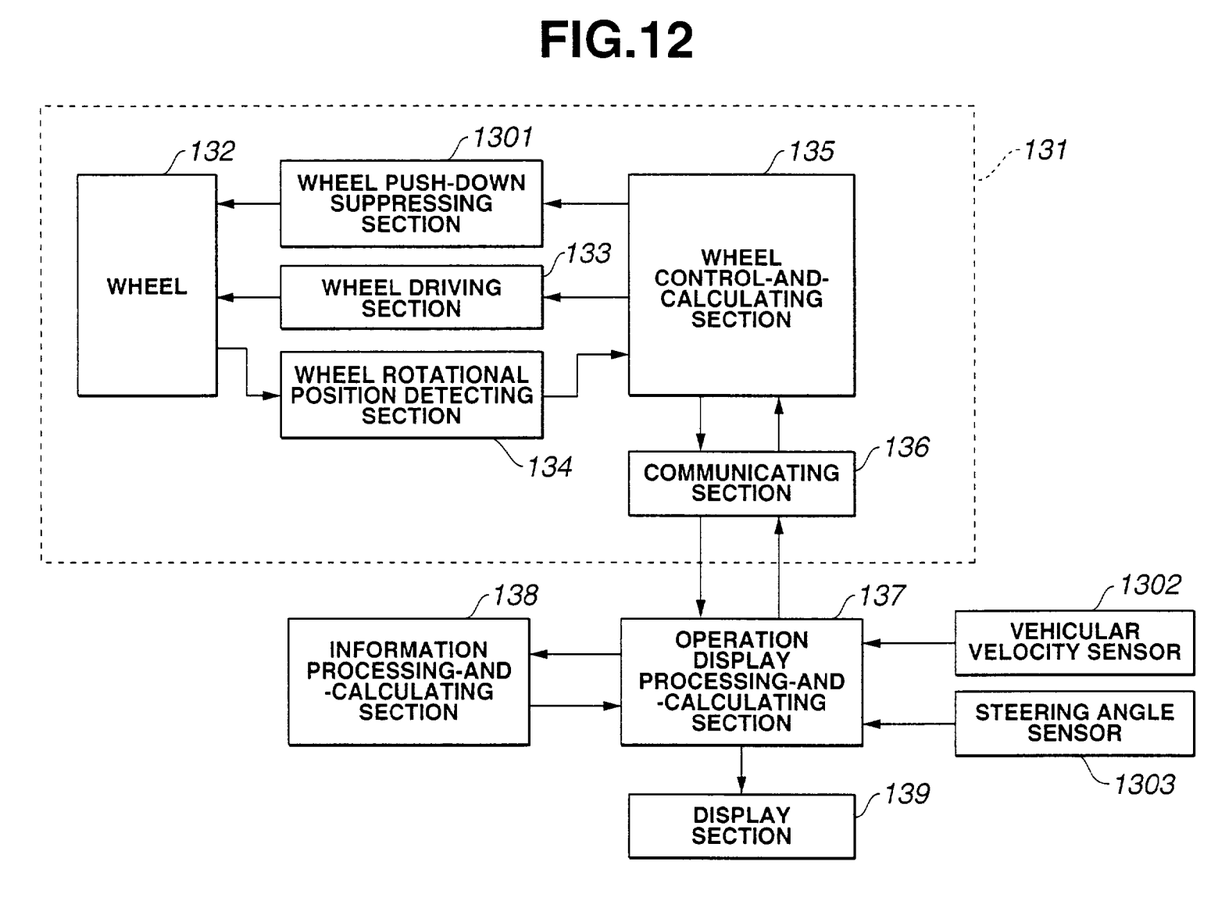
FIG. 12 is a block diagram representing a structure of the whole rotary input apparatus in the third embodiment according to the present invention.

Next, a third preferred embodiment of the rotary input apparatus according to the present invention will be described below. FIG. 12 shows a block diagram representing a structure of the rotary input apparatus in the third preferred embodiment according to the present invention. In the third embodiment, the rotary input apparatus is installed on a steering wheel of the vehicle and is used for controlling an on-vehicle equipment. In place of the acceleration sensor used to predict the wheel vibration in the second embodiment, a vehicular velocity sensor is utilized to obtain the same advantage as described in the second embodiment. In addition, with a switch operation during a steering operation as a situation under which the erroneous operation is easy to occur, the reaction force pattern which is made correspondent to the menu selected is controlled on the basis of the input signal from a steering angle sensor 1303 so that the erroneous operation is prevented from occurring. The outer appearance and operational function of the rotary input apparatus in the case of the third embodiment is generally the same as the first embodiment.

Operational input device 131 in the third embodiment is the same as that 111 in the second embodiment. The external structure connected to operational device 131 is generally the same as the second embodiment. Acceleration sensor 1202 in the second embodiment shown in FIG. 10 is replaced with vehicular velocity sensor 1302 as shown in FIG. 12. Furthermore, steering angle sensor 1303 is added. These are different points from the second embodiment.

Next, the developing method of the reaction force pattern in the third embodiment and the lock/unlocking method of the push operation therein will be described below. In the third embodiment, the selection menu list as shown in FIG. 2 is supposed as the object to be operated in the same way as described in the first embodiment.

First, in operation display processing-and-calculating section 137, the basic reaction force pattern corresponding to the selection menu list shown in FIG. 2 is corrected on the basis of the velocity inputted from vehicular velocity sensor 1302. The method of this correction is generally the same as the method of the correction of the reaction force pattern caused by the vibration in wheel control-and-calculating section 45 in the first embodiment (step 53 in FIG. 4). However, the difference is present in that a result predicted from the input from vehicular velocity sensor 1302 is used for the result of a detection on wheel vibration. It is necessary to derive such a calculation equation that the wheel vibration is predicted from vehicular velocity sensor 1302 through physical considerations or through the experiments.

Furthermore, the reaction force pattern after the correction caused by the vibration is furthermore corrected according to a steering angle (steering angular displacement) inputted from steering angle sensor 1303.

Basically, when the steering angle is equal to or wider than a predetermined steering angle, wheel control-and-calculating section 135 determines that the steering operation is being carried out. The depth and the interval of the detent pattern are further increased for the reaction force pattern after the correction caused by the wheel vibration and the waveform of the detent pattern is transformed from the sinusoidal wave to the rectangular wave. Hence, even under such a situation that the attention is not paid to the switch operation during the steering operation, the operator (driver) can clearly recognize the reaction force pattern. It is necessary to determine the actual correction quantities of the parameters through experiments in such a way that the reaction force pattern can be perceived under each condition of wheel vibration condition and steering angle condition. Furthermore, in a case where the differences among the individuals in the perception ability are considered, it is necessary to use the statistical method together with the experiments for the determination of the correction quantities. In addition, in place of the steering angle (steering angular displacement) as one of the conditions, a variation rate of the steering angle (viz., a steering angular velocity) may be adopted.

Furthermore, the correction of the parameters may be carried out in the continuous manner for each condition described above or may be carried out in the stepwise manner provided that the same advantages can be expected. The correction caused by the vibration from the reaction force pattern and the correction caused by the steering angle are cyclically carried out. The results of corrections are outputted to wheel control-and-calculating section 135 via communicating section 136. In addition, in order to make corrections caused by the vibration and steering angle accurate, it is desirable for the period of the calculation to be on the real time basis. The series of processing carried out in the wheel control-and-calculating section 135 is the same as the second embodiment.

In the rotary input apparatus installed on the vehicular steering system in the third embodiment, the same advantages as the second embodiment can be achieved. In this addition, even under a situation such that the attention is not paid in the switch operation due to the concentration on the steering operation, the detent pattern corresponding to the selection item can accurately be recognized by the operator. Such a situation that the operator mistakes the selection operation due to the fact that the detent pattern cannot be recognized or the operator gazes steadily the object to be operated such as the menu displayed on the display section 139 can be prevented from occurring. Furthermore, since the correction of the parameters is carried out so that the number of the detents is not more than required, the operational efficiency can be improved.

It is noted that, although each reference numeral of 41, 111, and 131 denotes the operational input device in each of the first, second, and third embodiments, each reference numeral of 41, 111, and 131 may denote the rotary input apparatus.

The entire contents of a Japanese Patent Application No. 2001-368138(filed in Japan on Dec. 3, 2001) are herein incorporated by reference. The scope of the invention is defined with reference to the following claims.

What is claimed is:

1. A rotary input apparatus comprising:
an operational end which is enabled to be rotationally operated;
an operational input device that detects a rotational displacement of the operational end to move a pointer displayed on a display section to perform a selection operation of any one of various kinds of selection items displayed on the display section; and
a driving force generating section that generates and transmits a driving force to the operational end in accordance with a reaction force pattern when the operational end is rotationally operated, the operational input device setting the reaction force pattern against the rotational displacement of the operational end and varying the reaction force pattern on the basis of an input signal from at least one of an internal of and an external to the operational input device when the operational end is rotationally operated, wherein
the input signal from at least one of the internal of and the external to the operational input device includes a vibration data surrounding of the operational end obtained by a detection of the vibration or a prediction thereof, and
the operational input device comprises a rotational position detecting section that detects a rotational position of the operational end and the vibration data is derived on the basis of a history of the rotational position of the operational end detected by the rotational position detecting section when the reaction force pattern is set to be constant irrespective of the rotational position of the operational end.

2. A rotary input apparatus as claimed in claim 1, wherein the input signal from at least one of the internal of and the external to the operational input device includes at least one data on an angular velocity of the operational end and on an angular acceleration thereof when the operational end is rotationally operated.

3. A rotary input apparatus as claimed in claim 1, which further comprises an acceleration sensor disposed in contact with the operational end and wherein the vibration developed on the surrounding of the operational end is predicted on the basis of an acceleration data measured by the acceleration sensor.

4. A rotary input apparatus as claimed in claim 1, wherein the rotary input apparatus is equipped in a vehicle and the vibration developed on a surrounding of the operational end is predicted on the basis of a vehicular velocity measured by a vehicular velocity sensor equipped in the vehicle.

5. A rotary input apparatus as claimed in claim 1, wherein the rotary input apparatus is equipped in a vehicle and the reaction force pattern is varied in accordance with a driving operation by a vehicle driver.

6. A rotary input apparatus as claimed in claim 5, wherein the driving operation by the vehicle driver is represented by a steering angle during a steering operation, a steering angle sensor detects the steering angle, and the reaction force pattern is varied in accordance with the steering angle.

7. A rotary input apparatus as claimed in claim 1, wherein the reaction force pattern is set to have a plurality of detents, each detent corresponding to one of the selection items displayed on the display and at least one of a plurality of parameters characterizing individual detents is varied in accordance with the input signal from at least one of the internal of and the external to the operational input device.

8. A rotary input apparatus as claimed in claim 7, wherein the parameters includes an interval of the reaction force pattern, a depth thereof, and a waveform thereof.

9. A rotary input apparatus as claimed in claim 1, wherein the operational end is also enabled to accept a push operation thereon, the operational input device detects the rotational displacement of the operational end and the push operation thereon to move the pointer displayed on the display section to perform the selection operation of any one of the various kinds of selection items displayed on the display section, the push operation on the operational end enabling a switching between an input acceptance and an input inhibit, and the switching between the input acceptance and the input inhibit is performed on the basis of at least one data on an angular velocity of the operational end and an angular acceleration thereof when the operational end is rotationally operated.

10. A rotary input apparatus as claimed in claim 9, wherein the input acceptance corresponds to an unlock of the push operation on the operational end and the input inhibit corresponds to a lock of the push operation thereon.

11. A rotary input apparatus as claimed in claim 1, wherein a basic reaction force pattern corresponding to a selection item menu list is corrected, the basic reaction force pattern having the same number of concavity formed detente as that of the selection items in the selection item menu list, each detent having pawls at both sides thereof and having a one-to-one corresponding relationship with one of the selection items.

12. A rotary input apparatus as claimed in claim 11, wherein as a magnitude of the vibration developed at the surrounding of the operational end becomes larger, each of a depth and an interval of each detent of the basic reaction force pattern becomes increased and a waveform of each detent is transformed from a sinusoidal wave to a rectangular wave.

13. A rotary input apparatus as claimed in claim 12, wherein an operational intensity for the operational end at an instant at which the operational end gets over one of the pawls of the present detent of the corrected basic reaction force pattern is monitored from the rotational displacement of the operational end by the rotational position detecting section and the corrected basic reaction force pattern is further corrected according to a magnitude of the operational intensity for the operational end at the instant at which the operational end gets over the pawl of the present detent.

14. A rotary input apparatus as claimed in claim 13, wherein, as the operational intensity for the operational end at the instant at which the operational end gets over the pawl of the present detent of the corrected basic reaction force pattern becomes larger than a predetermined operational intensity, the depth and the interval of the subsequent detent is increased and the waveform thereof is transformed from the sinusoidal wave to the rectangular wave.

15. A rotary input apparatus as claimed in claim 13, wherein, as the operational intensity for the operational end at the instant at which the operational end gets over the pawl of the present detent of the corrected basic reaction force pattern becomes smaller than a predetermined operational intensity, the depth and the interval of the subsequent detent is decreased and the waveform thereof is transformed from the sinusoidal wave to a triangular wave.

16. A rotary input apparatus comprising:

an operational end which is enabled to be rotationally operated;

an operational input device that detects a rotational displacement of the operational end to move a pointer displayed on a display section to perform a selection operation of any one of various kinds of selection items displayed on the display section; and a driving force generating section that generates and transmits a driving force to the operational end in accordance with a reaction force pattern when the operational end is rotationally operated, the operational input device setting the reaction force pattern against the rotational displacement of the operational end and varying the reaction force pattern on the basis of an input signal from at least one of an internal of and an external to the operational input device when the operational end is rotationally operated, wherein the input signal from at least one of the internal of and the external to the operational input device includes a vibration data on a surrounding of the operational end obtained by a detection of the vibration or a prediction thereof and wherein the operational input device comprises a rotational position detecting section that detects a rotational position of the operational end and the vibration data is derived on the basis of a history of the rotational position of the operational end detected by the rotational position detecting section when the reaction force pattern is set to be constant irrespective of the rotational position of the operational end.

* * * * *